Patented Dec. 2, 1952

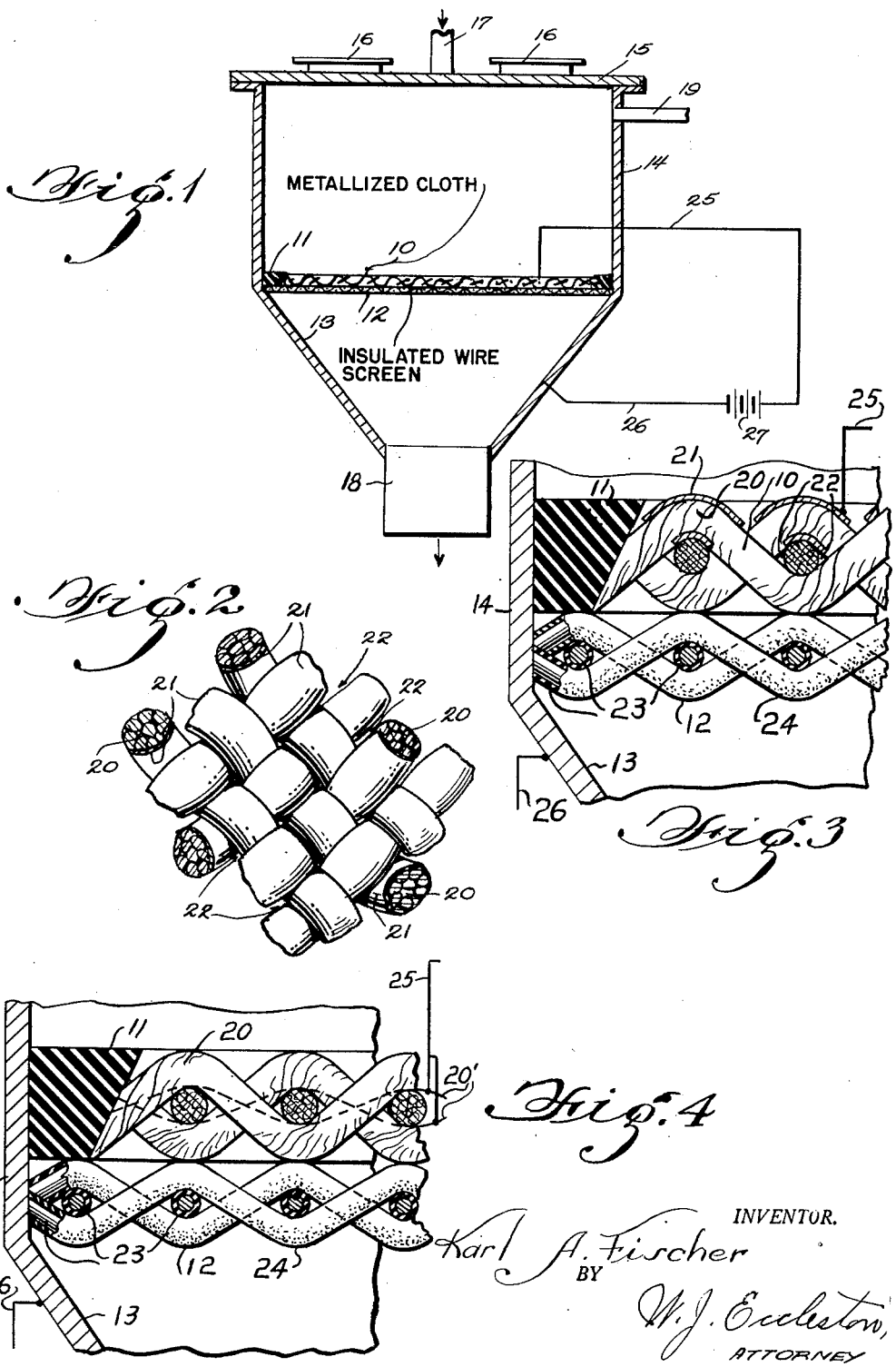

2,620,298

UNITED STATES PATENT OFFICE 2,620,298

APPARATUS FOR ELECTRICALLY FILTERING PARAFFINS

Karl A. Fischer, Washington, D. C.

Application May 13, 1948, Serial No. 26,913

3 Claims. (Cl. 204—299)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to the method and apparatus for filtering crystals and the like from non-conducting solutions and more particularly to an improved method and apparatus for the separation of paraffinic crystals in the dewaxing of oils or the like.

Generally the separation of wax from oils presents a problem of separating crystalline material which may range from microcrystalline sizes to large crystal sizes which may be hard or amorphous and compressible in nature. For the separation of such crystals it has been generally presumed that heavier material and denser fabrics would give better pour points with sacrifice of filtration velocity. That is, the general practice has been to utilize, a fine weave or less porous structure for small crystalline sizes, and for coarser crystals a filter having greater comparative porosity. Further unsatisfactory results are obtained by attempts made to separate crystalline materials by the inclusion of magnetic materials and the placement of a charge in the body of the non-conductive material or the use of a metal filter upon which a charge is placed.

It has been discovered that contrary to the general application of controlling porosity of the filter relatively proportional to crystalline size, a filter formed of smooth surfaced threads and woven to provide relative extreme porosity when utilized with static electricity may be used to secure more satisfactory crystalline and crystalline cake separation. This coarse filter structure may be utilized either for separating microcrystalline structures or larger crystalline sizes of the nature, for example, which occurs in oil products, to obtain dewaxed oils of reduced pour point and also increase the operating efficiency of plant production.

It is accordingly an object of this invention to provide an improved filter and method of filtration for separation of crystalline materials from solution.

Another object of this invention is to provide an improved method of dewaxing oils.

Another object of this invention is to provide a wax filtering method and apparatus which improves filtration velocity and provides greater efficiency in separation of wax cakes from a filter body.

A further object of this invention is to provide an improved device for dewaxing oils and forming wax cakes.

Other objects and advantages of the invention will be apparent from the following description when taken in connection with the accompanying drawings, in which, Figure 1 is a diagrammatic illustration in cross-section showing the mechanical arrangement of a filtering pan and filtering cloth;

Figure 2 is a partial view of the filter, partly in cross section; and

Figure 3 is a partial cross-sectional view of the filter and the filter support means diagrammatically illustrated in Fig. 1.

Figure 4 is a partial cross-sectional view of a modified filter and an enlarged insulated filter support with the insulation partially removed.

Referring to the drawings, a thin and extremely porous filter diaphragm 10 mounted in insulating ring or holder 11 is supported upon a grill-like insulated conductor base 12. The insulated conductor base 12 is adapted to be placed against or rest adjacent to the bottom 13 of filter pan 14 and is in electrical contact therewith as illustrated in Fig. 4. The filter area of diaphragm 10 is mounted within insulating ring 11 and supported by insulated conductor base 12 in a manner which prevents the occurence of detrimental moisture effects from water which may be contained in the solution or composition being filtered, such loss, for example, being in the nature of reduced capacitance or potential energy by reduction of resistance due to the presence of moisture. A cover plate 15 is mounted over the top of filter pan 14 and has a pair of viewing lenses or eye pieces 16 placed therein for observing the contents of pan 14. An inlet pipe 17 coupled with, for example, an oil line of a dewaxing plant (not shown) feeds into the top of pan 14 in a conventional manner.

At the base of the pan 14 is a suitable outlet pipe 18 which may be provided with suitable controls or the like of a conventional nature as used, for example, with filtering pans in a dewaxing plant. Adjacent the top portion of pan 14 is an exhaust vent 19 adapted to be a gas discharge outlet and means for draining off any overflow.

The filter, as shown in Fig. 2, is disclosed as a single layer structure woven from treated or untreated cotton threads 20 which have a metallic coating 21 over their individual top surfaces with their underside portions uncoated. The strands or threads 20 of the filter are illustrated in open weave form by the openings 22 which are relatively wide spacings comparative to the size of wax crystals which the filter separates from oil solvent solutions. The metallic coating may be provided by spraying or other suitable coating methods to provide a metallic layer from molecular dimensions to any depth desired. Other suitable materials, which are insoluble in liquid hydrocarbons, in the nature of smooth surfaced paper fabrics, silk, rayon, or the like may be substituted for the cotton fabric indicated in the particular arrangement and for the purposes as herein described.

As illustrated, in Fig. 3, the filter is represented with threads 20 previously woven and the metal coating 21 subsequently applied over the fibers with the spacings 22 remaining open. The support 12 for the filter, as illustrated, is a wire material 23 woven in conventional coarse open weave and having its surfaces coated with insulation 24. This insulation 24 may be of rubber or other material of a like insulating value. As shown in Figure 3, electrical conductor wire 25 is connected to metallic coating 21 of the first filter cloth, and electrical conductor wire 26 is connected to electrically conductive pan 14 which is insulated from the first filter cloth, pan 14 being in turn electrically connected to the wires 23 of the second filter cloth; conductor wires 25 and 26 are respectively connected to opposite poles of a source of electric potential (not shown).

The metallic coating 21 which covers a surface portion of threads 20 are adapted to be charged positively by conductor wiring 25, and the bottom 13 of pan 14 is in electrical contact with wires 23, and is charged negatively through conductor wiring 26 by means of battery 27 or other suitable D. C. power source, as diagrammatically illustrated in Fig. 1. By reason of the positive charge on the metal coating 21 and the negative charge on the base 13, a plate condenser-like effect is created, with the body of the filter 10 between the plates. That is, the filter pan substantially becomes a condenser with the solvent soaked filter a dielectric medium.

Fine conductor wires 20' as shown in Figure 4, are threaded or interwoven with the threads 20, and are attached to conductor 25, which, in the absence of metallic coating 21, may be utilized in the arrangement provided to obtain a static charge on the filter. In each case the fibre portion of the filter is a dielectric and the poles are separated a sufficient distance to prevent a moisture content, contained in oils or the like, from producing a current or disrupting the dielectric effect of the filter cloth.

As may be expected, from the standpoint of efficiency, the operation of a wax filtering plant is concerned with temperature, dilution, quantity of wash liquid, and rate of filtration. The first three factors can be determined and controlled with certainty whereas the filtration rate, while a predominant factor in determining plant throughput has been variable and inaccurate. Accordingly, the number and size of the filters are determinative of plant capacity expressed in throughput of oil per unit filter surfaces per unit time. It has therefore been the practice to provide excessive filters to offset the inaccuracy of calculation in filtration rate. Further, it has been found necessary to change the filter pads frequently due to clogging and imperfections developed. These imperfections occur primarily upon removal of the wax cake from the filter pad and the susceptibility of such pads to become saturated and clogged.

The filter pad 10, as described, is a thin structure having a pore size of a diameter in excess of wax crystal size. For example, wax crystals in propane-deasphaltized residual oils in a nonconductive dichloroethane solvent, chilled to $-25°$ C. by a conventional method, are much smaller than the diameter of the openings 22 provided by the open weaving of threads 20. Under ordinary filtering methods it is apparent that the open pores would allow the crystals to pass through this filter. However, by placement of a positive charge on the grid form or metallic coating 21 and a negative charge on base 13, it was discovered that upon filtration of the above composition all solid components remained on the filter and a filtrate run through the filter at the rate of 35 kg./m$^2$h and had a pour point of $-25°$ C. A sample of the same composition, in a conventional run, passed through a conventional linen sail cloth type filter of the same size at the filtration rate of 25 kilograms per square meter per hour and the filtrate had a pour point of $-19°$ C.

This improvement is due to the static electricity or charge on the filter and illustrates that the size of the pores, on a comparative basis, are relatively of less importance than heretofore believed. The electrical potential preferably is high, however, it may vary and the voltage be either great or small. With the pores of the filter cloth being a fraction of a millimeter in diameter or relatively large in comparison to crystal size there will be a comparatively powerful electric field in them even with small voltage. In the presence of this field the suspended crystalline particles undergo an aggregation and it is the agglomerated crystals which are readily held by the filter. The primary wax layer formed then acts as a filter aid for the rest of the charging stock.

The metallic surfacing 21 in addition to providing a condenser plate for the purposes as herein described also affords a smooth surfacing from which the wax cake can be easily separated. This separation may be done in a conventional manner with either dry or wet cakes without disrupting or tearing the thread structure of the filter. Also it has been found that the thread structure is less contaminated by adhering crystals and thereby improves and prolongs its useful life.

It has been found that a single ply of smooth surfaced fibre, when formed as a filter in the manner disclosed, facilitates removal of the cake material and in addition affords a strong filter structure even when made from cheap paper fabrics. Filters so produced, on a comparative basis reduce filter costs, increase the mechanical strength of thin filters besides improving filtration rate, cake separation and pour point of the filtrate, when used for dewaxing oils in the arrangements herein described.

In oil dewaxing and wax producing plants the filter pans or tanks are generally installed in parallel and in series as desired. Within these pans or tanks are positioned filter pads through which the filtrate is usually passed by controlled suction or in timed relationship to the formation and settling of crystals. A filter cloth of the character herein described may be inserted in the arrangement set forth to produce a panel or series of filters adaptable for use with conventional apparatuses provided non-conductor solutions and solvents are used.

Having thus described my invention of a method and apparatus whereby improved crystal separation in dewaxing oils is obtained in addition to improved plant efficiency, it is apparent that advantages may be obtained by adaptation to many and varied usages and that such modification is intended to be included within the scope of the appended claims.

I claim:

1. An electrostatic filter comprising a first electrically conductive filter cloth, being a weave of electrically interconnected filaments, a second filter cloth contiguous to said first filter cloth, said second filter cloth being a weave of electrically conductive insulation-covered filaments, said last-named filaments being electrically interconnected, first electrical means connected to said first filter cloth, said first electrical means being of one polarity whereby said first filter cloth is electrostatically charged with said polarity, and second electrical means connected to said second filter cloth, said second electrical means being of the opposite polarity whereby said second filter cloth is electrostatically charged with said opposite polarity.

2. An electrostatic filter comprising a first filter cloth being a weave of electrically non-conductive filaments and carrying an electrically conductive surface coating, said surface coating being electrically interconnected and providing a large plurality of passageways for the passage of liquid therethrough, a second filter cloth contiguous to said first filter cloth, said second filter cloth being a weave of electrically conductive insulation-covered filaments, said last-named filaments being electrically interconnected, first electrical means connected to the electrically conductive surface coating of said first filter cloth, said first electrical means being of one polarity whereby said electrically conductive surface coating of said first cloth is electrostatically charged with said polarity, and second electrical means connected to said second filter cloth, said second electrical means being of the opposite polarity whereby said second filter cloth is electrostatically charged with said opposite polarity.

3. An electrostatic filter comprising a first filter cloth being a weave of interwoven electrically non-conductive and electrically conductive filaments, a second filter cloth contiguous to said first filter cloth, said second filter cloth being a weave of electrically conductive insulation-covered filaments, said last-named filaments being electrically interconnected, first electrical means connected to said electrically conductive filaments of said first filter cloth, said first electrical means being of one polarity whereby said electrically conductive filaments of said first filter cloth are electrostatically charged with said polarity, and second electrical means connected to said second filter cloth, said second electrical means being of the opposite polarity whereby said second filter cloth is electrostatically charged with said opposite polarity.

KARL A. FISCHER.

REFERENCES CITED

The following references are of record in the file of this patent:

UNITED STATES PATENTS

| Number | Name | Date |
| --- | --- | --- |
| 1,097,377 | Teuffer | May 19, 1914 |
| 1,162,213 | Bloom | Nov. 30, 1915 |
| 2,040,806 | Feigl | May 12, 1936 |
| 2,054,075 | Fisher | Sept. 15, 1936 |
| 2,116,509 | Cottrell | May 10, 1938 |
| 2,292,608 | Buckman et al. | Aug. 11, 1942 |

OTHER REFERENCES

"Hackh's Chemical Dictionary," second edition (1937), page 265, definition of "crystalloid."